United States Patent [19]

Dyck

[11] 4,383,584
[45] * May 17, 1983

[54] SEALED LOAD CELL CONSTRUCTION

[75] Inventor: George J. Dyck, Saskatoon, Canada

[73] Assignee: International Road Dynamics Inc., Saskatchewan, Canada

[*] Notice: The portion of the term of this patent subsequent to Nov. 23, 1999, has been disclaimed.

[21] Appl. No.: 277,704

[22] Filed: Jun. 26, 1981

Related U.S. Application Data

[63] Continuation-in-part of Ser. No. 128,361, Mar. 7, 1980.

[51] Int. Cl.³ .............................................. G01G 5/04
[52] U.S. Cl. ..................................... 177/208; 177/254
[58] Field of Search ................................ 177/208, 254

[56] References Cited

U.S. PATENT DOCUMENTS

| | | | |
|---|---|---|---|
| 3,613,441 | 10/1971 | Papirno | 177/208 X |
| 3,765,497 | 10/1973 | Thordarson | 177/208 |
| 4,062,415 | 12/1977 | Miller | 177/208 |
| 4,064,955 | 12/1977 | Dyck | 177/254 X |

Primary Examiner—George H. Miller, Jr.
Attorney, Agent, or Firm—Birch, Stewart, Kolasch & Birch

[57] ABSTRACT

A load measuring device is provided herein which operates with a small amount of vertical travel. The load measuring device includes a base with a thin sealed fixed volume reservoir having a non-compressible fluid (e.g. oil) or soft rubber therein forming the lower portion of the base. A flexible diaphragm is provided which seals such thin reservoir and is in direct contact with the non-compressible fluid or the soft rubber in the reservoir. A platform is provided for applying a load directly to the diaphragm. Finally, a transducer including an integral diaphragm is held in direct contact with the flexible diaphragm to provide a reading which is proportional to the absolute value of the load. The invention thus provides a sealed, shockproof, hydraulic load cell whose manufacture is greatly simplified and whose cost is reduced both in terms of time and material. Moreover, its installation in a weigh scale is much simplified since there is no hydraulic connection needed between the load cell and the transducer.

24 Claims, 5 Drawing Figures

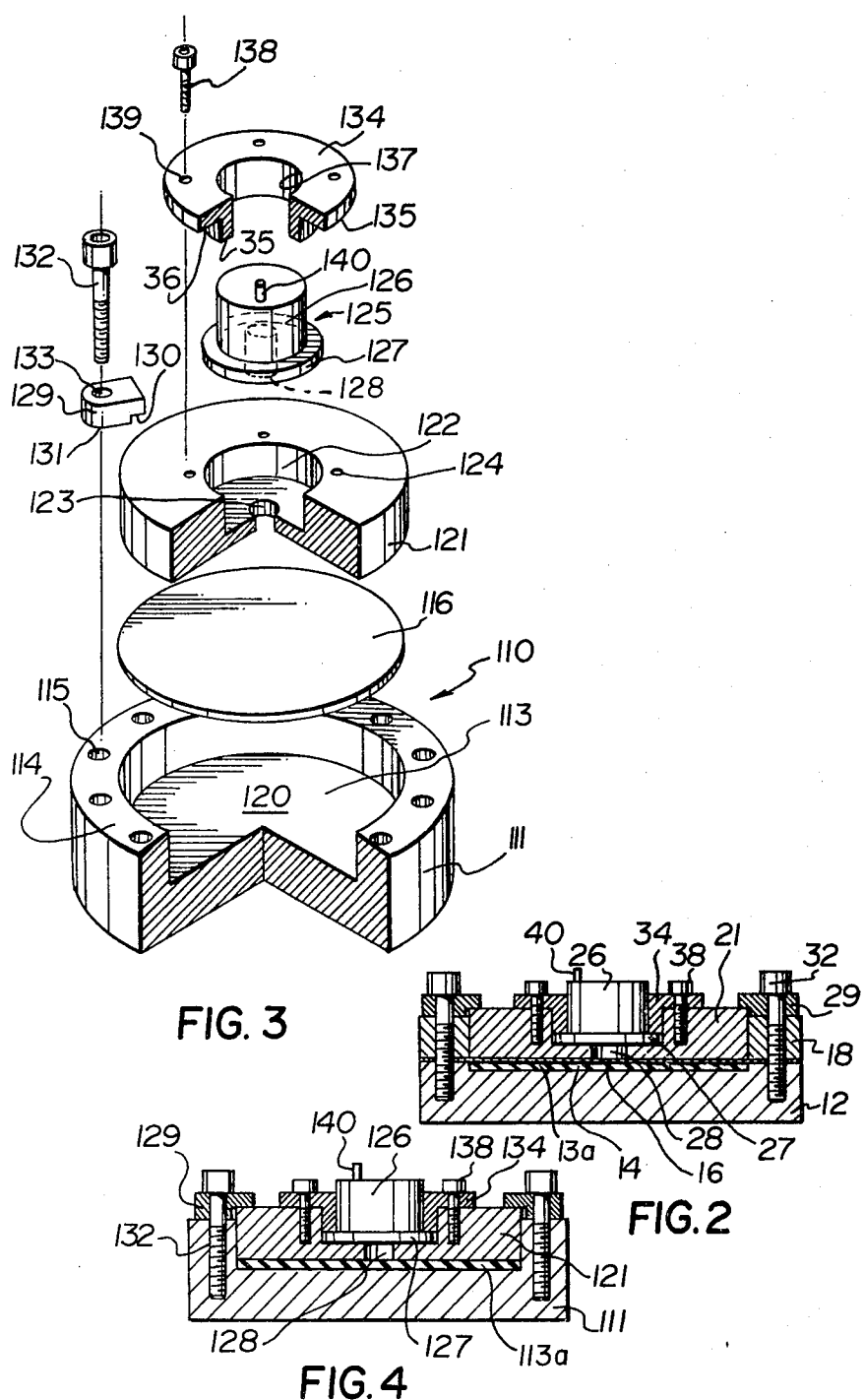

4,383,584

SEALED LOAD CELL CONSTRUCTION

BACKGROUND OF THE INVENTION

(i) Related Applications

This application is a continuation-in-part of application Ser. No. 128,361 filed Mar. 7, 1980.

(ii) Field of the Invention

This invention relates to components for weighing scales and more particularly to sealed hydraulic load cells. It also relates to weighing scales including such hydraulic load cells.

(iii) Description of the Prior Art

Present weighing scales, especially those for weighing vehicles in motion, generally have four or more load cells. These load cells are either of the strain gauge or of the linear variable differential transformer type. Usually, this means that one load cell is placed at each corner of the scale and the vehicle driving over the scale progressively loads and unloads the load cells as the vehicle moves across the platform. The process of sampling these multiple load cells and reconstructing the signal for final resolution to provide a readout proportional to the weight has proven difficult and costly.

Moreover, prior hydraulic load cells are generally not suitable for highway scale weighing as they have too slow a response due to the large amounts of vertical travel. In addition, some of the prior load cells are provided with diaphragms with rolled or folded edges, and the elasticity of the diaphragm results in excessive vertical travel. In addition, prior hydraulic load cells have required accurate placement of the hydraulic line between the pressure chamber and the transducer.

Among the prior patents which are directed to such load cells and such weigh scales are the following U.S. patents:

| | | | |
|---|---|---|---|
| 1. | D. F. Axelson | 1,585,634 | May 25, 1926 |
| 2. | L. S. William | 2,646,236 | July 21, 1953 |
| 3. | Ellis | 3,082,834 | |
| 4. | E. W. Schellentrager | 3,123,166 | March 3, 1964 |
| 5. | C. E. Lee | 3,266,584 | August 16, 1966 |
| 6. | Farquhar | 3,354,973 | |
| 7. | D. E. Smith | 3,472,329 | October 14, 1969 |
| 8. | Schwartz | 3,658,143 | |
| 9. | F. M. Conley | 3,797,593 | March 19, 1974 |
| 10. | C. D. Bradley et al | 3,933,212 | January 20, 1976 |
| 11. | K. H. Nordstrom et al | 3,935,914 | February 3, 1976 |
| 12. | A. Goldberg | 3,966,001 | June 26, 1976 |
| 13. | K. Von Drygalski | 3,980,148 | September 14, 1976 |
| 14. | H. A. Wagner | 3,999,621 | December 28, 1976 |
| 15. | M. Ohta et al | 4,078,623 | March 14, 1978 |
| 16. | G. Dyck | 4,064,955 | December 27, 1977 |
| 17. | P. L. Christiansson | 4,102,422 | July 25, 1978 |
| 18. | V. S. Czyryk | 4,134,467 | January 16, 1979 |

(iv) Discussion of the Prior Art

Because of their shock-proof nature, hydraulic load cells are assuming greater and greater significance in both the static and dynamic weighing field. Loads with a steep wave front where the weight might appear as suddenly as the natural frequency of single or multiple column load cells have a tendency to damage or to destroy a bridge gauge system. Also, because of the stiffness of the design of column load cells, it becomes increasingly more difficult to build in protection for sudden overloads.

In addition, Dyck, in U.S. Pat. No. 4,064,955 issued Dec. 27, 1977 disclosed the use of an hydraulic load cell including a straight diaphragm with a fluid passage leading to a transducer in such a manner that, when the transducer was removed the fluid could escape unless prevented by a valve. In that patent, the hydraulic load cell was positioned between the platform and the base structure. The load cell included a piston vertically movable within a cylinder having an upper portion and a base portion. A load on the platform transmitted force to the piston through an adjustable force-transmitting member and ball. The force on the piston increased the pressure in the chamber of the load cell, which pressure was measured by a suitable transducer which communicated with the chamber by means of a passageway.

(vii) Deficiencies of the Prior Art

Because of the interconnection between the load cell chamber and the transducer, it becomes necessary, periodically, to refill and to bleed the system for absolutely air-free operation. In addition, installation was difficult due to problems of accurately lining up the interconnection line or lines.

SUMMARY OF THE INVENTION

(i) Aims of the Invention

Accordingly, it is a broad object of this invention to provide a sealed, shockproof, hydraulic load cell for dynamic weighing of highway vehicles.

Another object of this invention is to provide a sealed, hydraulic load cell for static weighing.

A further object of this invention is to provide such an hydraulic load cell which includes a flexible fluid cell chamber.

A still further object of this invention is to provide a self-contained compression hydraulic load cell structure based on the fluid load cell technique.

Yet another object of this invention is to provide a tension hydraulic load cell structure based on the fluid load cell technique.

A further object of this invention is to provide such a hydraulic load cell which has a natural minute damping of the fluid and diaphragm which enables shock proofing a pressure transducer independently, thereby making it virtually impossible to destroy a hydraulic load cell by overload or by shock.

Yet another object of this invention is the provision of a new sealed load cell whose manufacture is greatly simplified and whose cost is reduced both in terms of time and material.

(ii) Statements of Invention

This invention broadly provides a load measuring device which operates with a small amount of vertical travel comprising: (a) a base; (b) a thin sealed, fixed volume reservoir forming the lower portion of the base; (c) a load-transmitting material in the form of a non-compressible fluid or a soft rubber in the thin reservoir; (d) a flexible diaphragm sealing such thin reservoir and being in direct contact with the load-transmitting material in the reservoir; (e) means for applying a load directly to the flexible diaphragm; and (f) a transducer including an integral diaphragm at the base thereof held with such integral diaphragm in direct contract with the flexible diaphragm to provide a reading proportional to the value of the load.

This invention also preferably provides a load measuring device operating with a small amount of vertical travel comprising: (a) a base; (b) a thin sealed, fixed volume reservoir for a load-transmitting non-compressible fluid or a soft rubber forming the lower portion of the base; (c) a flexible diaphragm sealing such thin reservoir and being in direct contact with the non-compressible fluid in the reservoir; (d) means for applying a load directly to the diaphragm; and (e) a transducer including an integral diaphragm at the base thereof held with such integral diaphragm in direct contact with the flexible diaphragm to provide a reading proportional to the value of the load.

This invention still further provides a load measuring device operating with a small amount of vertical travel is provided, comprising: (a) a base including a cylindrical chamber near the bottom thereof; (b) a flexible diaphragm disposed in fixed position a small distance from the bottom of the cylindrical chamber to define, therebetween, a thin sealed, fixed volume reservoir for load-transmitting a non-compressible fluid or soft rubber; (c) a piston slidable within the cylindrical chamber and resting in face-to-face contact with the flexible diaphragm to apply a load to the flexible diaphragm; and (d) a transducer including a integral diaphragm at the base thereof held with such integral diaphragm in direct contact with the flexible diaphragm to provide a reading proportional to the value of the load.

This invention provides still further as shown in FIG. 5, a weigh scale comprising: (a) a fixed peripheral frame base structure; (b) a central load supporting platform; (c) means for interconnecting the platform with the peripheral frame base structure to allow limited vertical motion of the platform, the interconnecting means comprising at least three torque transmitting tubular bars arranged around the perimeter of the load supporting platform, with one portion of each of the tubular torque bars being supported with respect to the fixed peripheral frame base structure, and another portion of each torque bar being supported with respect to the central load supporting platform; and (d) a load measuring device centrally supporting the load supporting platform, the load measuring device comprising a base, a thin sealed, fixed volume reservoir for a load-transmitting non-compressible fluid or soft rubber forming the lower portion of the base, a flexible diaphragm sealing such thin reservoir and being in direct contact with the non-compressible fluid or soft rubber in the reservoir, means for applying a load directly to the diaphragm, and a transducer including an integral diaphragm at the base thereof held with such integral diaphragm in direct contact with the flexible diaphragm to provide a reading proportional to the value of the load, and including means connected to the transducer to convert the value of the load to weight.

This invention still further provides a weigh scale comprising: (a) a fixed peripheral frame base structure; (b) a central load supporting platform; (c) means for interconnecting the platform with the peripheral frame base structure to allow limited vertical motion of the platform, the interconnecting means comprising at least three torque transmitting tubular bars around the perimeter of the load supporting platform, with one portion of each of the tubular torque bars being supported with respect to the fixed peripheral frame base structure, and another portion of each torque bar being supported with respect to the central load supporting platform; and (d) a load measuring device centrally supporting the load supporting platform, the load measuring device comprising a base including cylindrical chamber near the bottom thereof, a flexible diaphragm disposed in fixed position a small distance from the bottom of the cylindrical chamber to define, therebetween, a thin sealed, fixed volume reservoir for a load-transmitting non-compressible fluid or soft rubber, a piston slidable within the cylindrical chamber and resting in face-to-face contact with the flexible diaphragm to apply a load directly to the diaphragm, and a transducer including an integral diaphragm at the base thereof held with such integral diaphragm in direct contact with the flexible diaphragm to provide a reading proportional to the value of the load and including means connected to the transducer to convert the value of the load to weight.

(iii) Other Features of the Invention

By one feature of the load measuring device the piston is provided with a central recess and a concentric aperture; and the transducer includes a portion resting in the central recess and a portion including an integral diaphragm at the base extending through the concentric aperture in direct face-to-face contact with the flexible diaphragm.

By another feature of the load measuring device, the transducer includes an upper portion through which the load is applied to the diaphragm via the piston.

By another feature of the load measuring device, the base comprises: (i) a base member including a thin central recess therein defining a sealed fixed volume, thin oil chamber, and an annular shelf therearound; (ii) a flexible diaphragm secured to the annular shelf; and (iii) a ring, secured to the annular shelf and defining the cylinder chamber.

By a further feature of the load measuring device, the base comprises: (i) a base member including a deep recess therein surrounded by an annular shelf, thereby defining the cylinder chamber; and (ii) a hollow disc-shaped sac formed of flexible material filled with a non-compressible fluid, disposed at the bottom of the cylinder chamber, thereby defining in one element, the sealed fixed volume, thin reservoir and the flexible diaphragm.

By another feature of the load measuring device, the thin reservoir contains a film of hydraulic fluid as low as about 0.005 inches in depth.

By yet another feature of the load measuring device, the thin reservoir contains a sheet of flexible rubber, having a coating of graphite on the two flat surfaces thereof, the rubber being as thin as about 0.005 inches.

By another feature of the load measuring device, the load measuring device includes means connected to the transducer to convert the load change to weight.

Additional features of the weigh scale embodiment of this invention include the further features of the preferred load measuring device described hereinabove incorporated into the weigh scale.

This invention also provides a load measuring device which operates with a small amount of vertical travel comprising: (a) a base; (b) a thin sealed, fixed volume reservoir forming the lower portion of said base; (c) a load-transmitting material in the form of a noncompressible fluid or a soft rubber in a thin reservoir; (d) a flexible diaphragm sealing such thin reservoir and being in direct contact with the load-transmitting material in the reservoir; (e) means for applying a load directly to the diaphragm; and (f) a transducer held in direct contact with the diaphragm to produce a reading proportional to the value of the load.

BRIEF DESCRIPTION OF THE DRAWINGS

In the accompanying drawings,

FIG. 2 is a diametrical cross-section of the embodiment of FIG. 1;

FIG. 3 is an exploded view of the load measuring device of another embodiment of this invention;

FIG. 4 is a diametrical cross-section of the aspect of FIG. 3; and

DESCRIPTION OF PREFERRRED EMBODIMENTS

Figure 1:
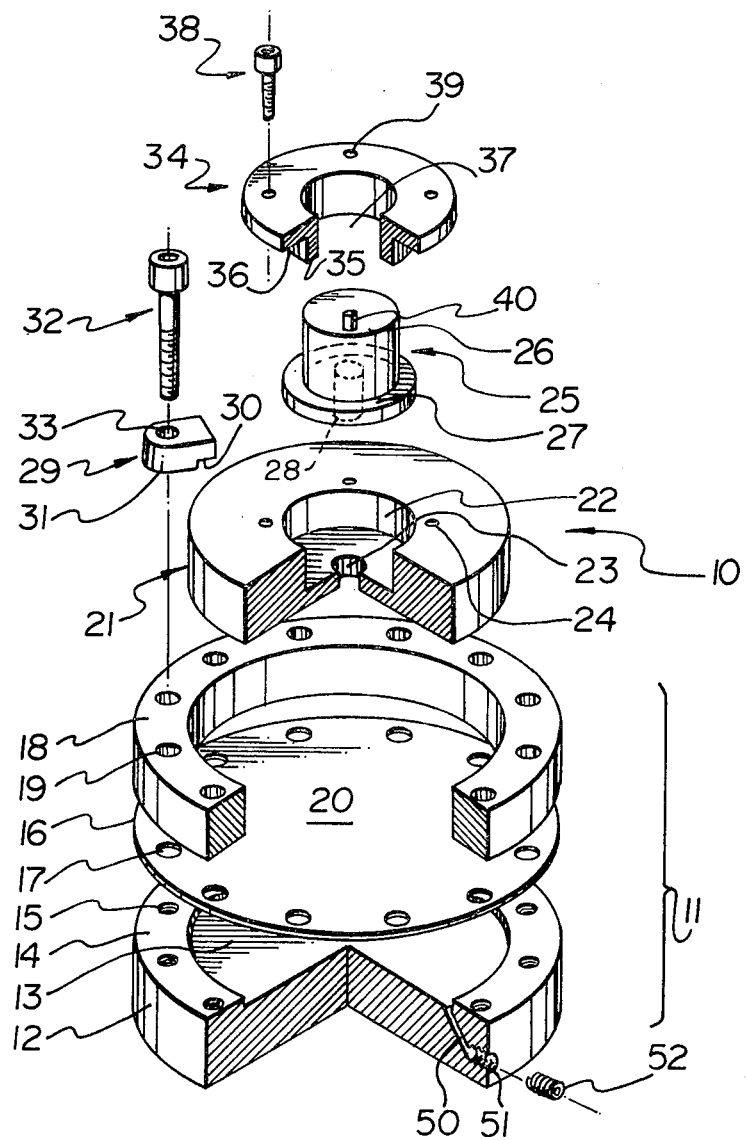
FIG. 1 is an exploded view of the load measuring device of one embodiment of the invention.
Figure 5:
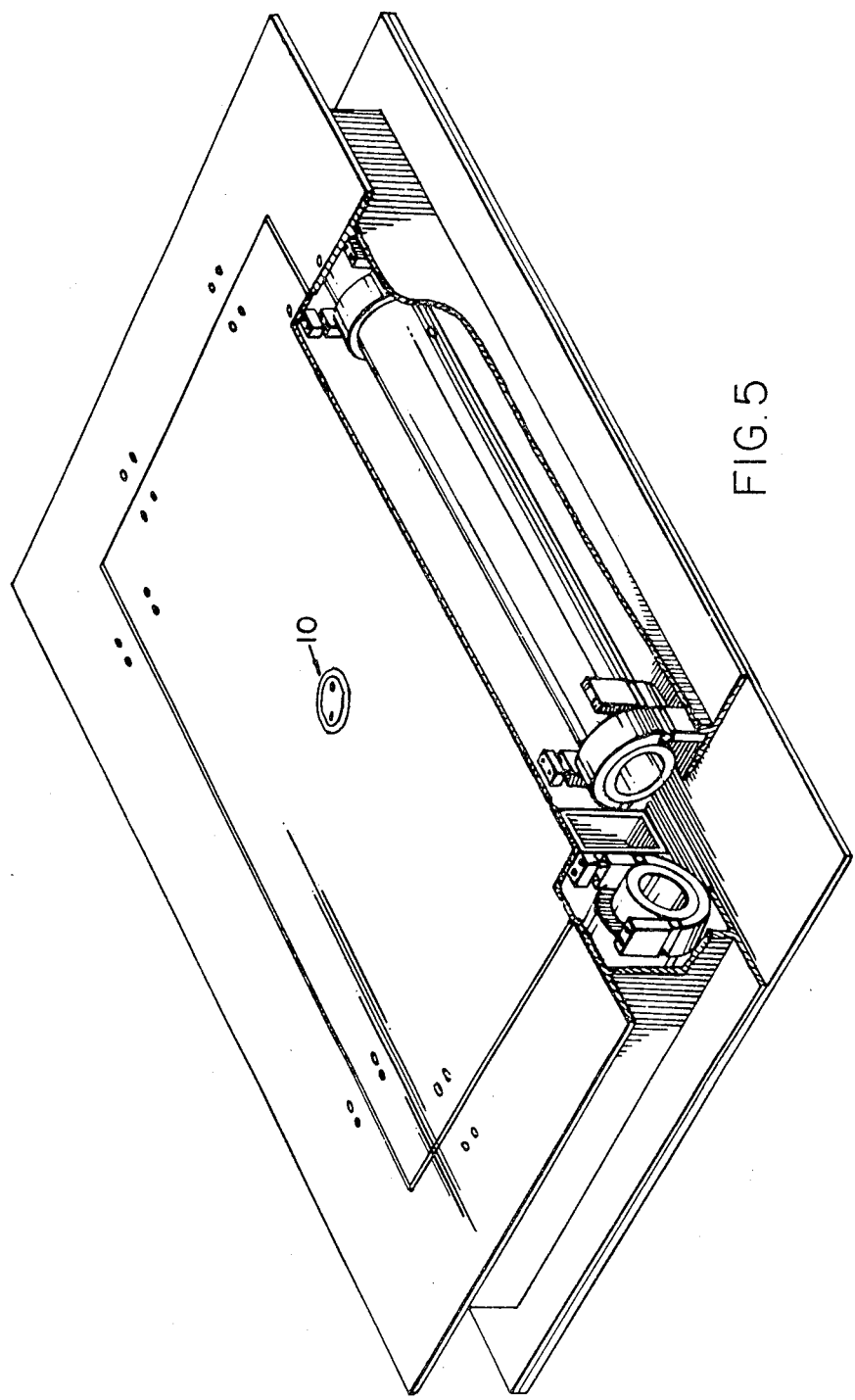
FIG. 5 illustrates a weigh scale utilizing the load measuring device of the present invention.

(i) Description of FIGS. 1 and 2

As seen in FIGS. 1 and 2 the load measuring device 10 includes a base 11 comprised of a lower base portion 12 including a central recess 13 defining a fluid reservoir and an annular rim 14 provided with a plurality of spaced-apart, internally threaded apertures 15. Typically the recess 13 is as low as about 0.005 inches in depth and is adapted to be filled with a load-transmitting material, e.g. non-compressible fluid, e.g., a hydraulic fluid, oil, or a silicone grease. The load-transmitting material may alternatively be sheet of soft rubber 13a, coated on both its flat faces with graphite. The base 11 also includes a flexible diaphragm 16 provided with a plurality of spaced-apart peripheral mounting holes 17. Flexible diaphragm 16 may be made of any flexible or elastically bendable sheet-like material, e.g. the polytetrafluoroethylene polymer known by the Trade Mark TEFLON. Holding the diaphragm 16 in place is a mounting ring 18 provided with a plurality of spaced-apart peripheral mounting holes 19. The mounting ring 18 also serves to define, by its central aperture, the cylindrical chamber 20. The base 12 is provided with a passage 50 and a spout 51 by which hydraulic fluid is admitted to reservoir 13. Then the reservoir is sealed by screw plug 52.

Resting in the cylindrical chamber 20 atop flexible diaphragm 16 is piston head 21. Piston head 21 is provided with a central recess 22 and a concentric aperture 23, as well as with a plurality of spaced-apart internally threaded mounting holes 24. Disposed within recess 22 is a transducer 25, which includes an upper load-transmitting portion 26, an annular base portion 27 adapted to rest on the floor of the recess 22, and a centrally axially projecting integral diaphragm portion 28 adapted to project through aperture 23 and to rest with its integral diaphragm in face-to-face contact with the flexible diaphragm 16. The transducer 25 is provided with conventional plugs 40 to connect it to a device for converting pressure charges in reservoir 13 due to load changes to a measure.

While any transducer having an integral diaphragm at its base may be used, one proprietory brand which has been successfully used in the pressure transducer type P725-P727 sold by Schaevitz Engineering, Pennsauken, New Jersey. This transducer includes four strain gauges which are bonded to a double cantilever beam on a foam-active-arm Wheatstone Bridge configuration. The cantilevers are connected via integral flexures to a force rod which is welded to the force-summing diaphragm, providing good isolation from thermal transients. Of all welded construction, the transducer is manufactured entirely from stainless steel and incorporates transient and high over pressure protection by means of a positive overload stop.

Holding the assembly 10 in assembled condition are: firstly, 2 or 3 el-shaped retaining brackets 29, one face 30 of which rests atop the upper face of piston head 21, the second face 31 of which rests atop the upper face of ring 18, with a respective bolt 32 passing through aperture 33 (in bracket 29) and tapped holes 19A in annular lip 18 and secondly, an el-shaped concentric retaining ring 34, one face 35 of which rests atop the upper surface of annular base 27, the other face 36 of which rests atop the top surface of piston head 21, with the upper portion 26 of the transducer embraced by central aperture 37, and secured by bolts 38 passing through apertures 39 (in ring 34) and into tapped holes 24.

(ii) Description of FIGS. 3 and 4

As seen in FIGS. 3 and 4, the load measuring device 110 includes a base 111, which includes a central recess 113 defining a peripheral lip 114 within which is a cylindrical chamber 120. Peripheral lip 114 is provided 2 or 3 tapped apertures 115.

The reservoir flexible diaphragm is provided by a disc-shaped hollow sac 116 formed of a suitable flexible plastics material, e.g., P.V.C. A suitable load-transmitting material, e.g., a non-compressible fluid, e.g., a hydraulic fluid or oil, fills the sac 116 and is sealed therein. The load-transmitting material may alternatively be a sheet of soft rubber 113a, coated on both its flat faces with graphite. When the filled sac 116 is placed on the floor of the cylinder chamber 120, its upper surface provides a suitable flexible diaphragm.

Resting in the cylindrical chamber 120 atop flexible diaphragm 116 is piston head 121. Piston head 121 is provided with a central recess 122 and a concentric aperture 123, as well as with a plurality of spaced-apart internally threaded mounting holes 124. Disposed within recess 122 is a transducer 125, which includes an upper load-transmitting portion 126, an annular base portion 127 adapted to rest on the floor of the recess 122, and a centrally axially projecting integral diaphragm portion 128 adapted to project through aperture 123 and to rest in face-to-face contact with the flexible diaphragm 116. The transducer 125 is provided with conventional plugs 140 to connect it to a device for converting pressure changes in sac 116 due to load changes to a measure of weight.

Holding the assembly 110 in assembled condition are: firstly, 2 or 3 el-shaped retaining brackets 129, one face 130 of which rests atop the upper face of piston head 121, the second face 131 of which rests atop the upper face of lip 114, with a respective bolt 132 passing through aperture 133 (in bracket 129), and tapped holes 115 in annular lip 114; and secondly, an L-shaped concentric retaining ring 134, one face 135 of which rests atop the top surface of piston head 121, with the upper portion 126 of transducer embraced by central aperture 137, and secured by bolts 138 passing through apertures 139 (in ring 134) and into tapped holes 124.

(iii) Description of Weighing Scale Embodiment

The load measuring device of an embodiment of the present invention is preferably used in association with a load supporting platform and a fixed base structure to provide a weighing scale of another embodiment of this invention. One variant of the load supporting platform/fixed base structure/torque transmitting bars combination which may be used in providing the weigh scale of this embodiment of the invention using the load measuring device of a first embodiment of this invention is disclosed and claimed in the aforementioned Dyck U.S. Pat. No. 4,064,955 issued Dec. 27, 1977. While the contents thereof are incorporated herein by reference, this embodiment may be summarized as follows:

As shown in FIG. 6, the weighing scale comprises a load supporting platform and a fixed base structure. The platform is interconnected with the base by torque transmitting bars arranged around the perimeter of the platform, and support and roller assemblies, at least one assembly for each end of each torque bar. The interconnection of the platform with the base is such as to allow only vertical motion of the platform, and to allow such vertical motion with little resistance or friction.

Each of the support and roller assemblies comprises four support element pairs. One pair is attached to the platform, two other pairs are attached to horizontally opposite sides of the torque bar, and the final pair is attached to the base. Each support element pair, has an upwardly facing bearing surface and downwardly facing surface. Each of the bearing surfaces is disposed on wear resistant pad inserts mounted on the support elements. Rollers are disposed between the adjacent upwardly and downwardly facing surfaces of two of the support element pairs, and between the adjacent surfaces of the other two pairs. For example, one roller is disposed between the upwardly facing surface of one pair and the adjacent downwardly facing surface of the other pair.

Each of the support elements attached to the torque bar 4 is integrally connected with another support element on the opposite side of the torque bar in the form of a strap that surrounds one half of the torque bar. The support elements need not be interconnected in this manner, but could be separate elements attached individually to the torque bar.

The support elements of each pair of offset longitudinally from one another along the torque bar. This allows all the bearing surfaces that are attached to the torque bar to be on a common horizontal plane passing through the central axis of the torque bar, thereby minimizing horizontal forces due to vertical motion of the platform. The offset arrangement also facilitates provision for adjustment.

Adjusting means are provided to allow vertical adjustment of one of each of the support elements attached to the platform and base, respectively, to facilitate clearance or preload adjustment between the bearing surfaces and rollers. For greater rigidity, additional support and roller assemblies may be placed at intermediate points between the ends of the torque bars.

The arrangement of the torque bars and the support and roller assemblies provides that the platform remains horizontal with minimal deflection when a load is applied at any point on the platform and limits the platform to vertical motion with high precision and rigidity. The use of rollers provides low friction or resistance to vertical travel of the platform providing high sensitivity over a wide range of loads. The high degree of rigidity and low friction make it possible to use a single centrally located load cell. At the same time, a single load cell reduces the complexity of the apparatus.

The hydraulic load cell of the first embodiment of this invention is disposed between the platform and the base structure. A load on the platform transmits force to the piston of the load cell through a vertically adjustable force transmitting member and ball. The force on the piston increases the pressure in the pressure chamber (the then reservoir) which is measured by the integral diaphragm of the transducer.

Means for centering the platform and for substantially preventing horizontal movement thereof include a pin and balls which pivotally interconnect the platform and base structure allowing vertical motion of the platform with little added friction. Two such pin and ball assemblies are included on each of the four sides of the platform. The pin passes through an aperture in the torque transmitting bar. Horizontal adjustment is provided by a screw.

In order to achieve the lowest possible response time, the vertical travel of the load cell should be as small as possible. Vertical travel of the piston, and hence platform, can be decreased by increasing the area of the piston. Reduced vertical travel of the piston allows the use of the flat diaphragm which minimizes elasticity, a cause of excess vertical travel. Decreased vertical travel of the piston allows a reduction of depth of the pressure chamber which minimizes temperature effects.

When the load cell of embodiments of this invention is installed in the weigh scale of other embodiments of this invention, the stability thereof is assured and so there is no "tilting" of the diaphragm when a load is applied thereto. However, for other installations the stability of the load cell will have to be assured, e.g. by means well known to those skilled in the art. For example, the cylinder may be provided with four diametrically opposed blind holes, within each of which is placed a hardened pad and a load bearing ball. Stabilizer rods are provided, one end of which is adjustably located in contact with the ball, the other end of which is supported by a frame structure.

The very low vertical travel makes it possible to cover and/or seal the weighing scale for protection of this embodiment of this invention. For example, the entire structure may be enclosed, utilizing a flexible sheet material on the top surface, thereby preventing contamination by dust, moisture, etc., and confining a lubricant for the pad and roller assemblies. Also, the weighing scale may be covered by a flexible road surface material, e.g., asphalt, making it possible to place the scale inconspicuously on a highway.

If it is desired to use the weighing scale of this embodiment of this invention for weighing vehicles at higher speeds, the smoothings of the highway portion leading to the weighing scale becomes more important since any irregularities cause transient perturbations in the vehicle suspension. An effective method of achieving smoothness is to resurface the highway for a distance of about 200 feet leading to the scale, over the scale itself and for about 50 feet beyond the scale with a continuous mat of asphalt about 1 inch thick.

OPERATION OF THE PREFERRED EMBODIMENT

In operation, when an article to be weighed, e.g. a truck, passes over the weigh scale and applies a load force to the piston. The transducer, which is mounted flush to the bottom of the piston, instantly senses the change in hydraulic pressure and measures the load through the flexible diaphragm or through the sealed pressure sac which is in face-to-face contact with the integral diaphragm of the transducer. This pressure change is converted to a direct measure of weight of the article.

The base/cylinder unit can be separate or be machined into the floor of a static or dynamic weighing scale. The cross-sectional shape of the load cell can be selected at will to be round, square, rectangular, etc.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A load measuring device operating with a small amount of vertical travel comprising:
   (a) a base;
   (b) a thin sealed, fixed volume reservoir forming the lower portion of said base;
   (c) a load-transmitting material in the form of a non-compressible fluid or a soft rubber in said thin reservoir;
   (d) a flexible diaphragm sealing said thin reservoir and being in direct contact with said load-transmitting material in said reservoir;
   (e) means for applying a load directly to said diaphragm; and
   (f) a transducer including an integral diaphragm at the base thereof held with such integral diaphragm in direct contact with said flexible diaphragm to provide a reading proportional to the value of said load.

2. The load measuring device of claim 1 wherein said load-transmitting material is in the form of a non-compressible fluid which comprises a hydraulic fluid or a liquid silicone.

3. The load measuring device of claim 1 wherein said load-transmitting material comprises a soft rubber disc the flat surfaces of which are coated with graphite.

4. The load measuring device of claim 1 including means connected to said transducer to convert said value of said load to weight.

5. A load measuring device operating with a small amount of vertical travel comprising:
   (a) a base including a cylindrical chamber near the bottom thereof;
   (b) a thin sealed, fixed volume reservoir for a load transmitting material in the form of a non-compressible fluid forming the lower portion of said base;
   (c) a flexible diaphragm sealing said thin reservoir and being in direct contact with said non-compressible fluid in said reservoir;
   (d) means for applying a load directly to said diaphragm; and
   (e) a transducer including an integral diaphragm at the base thereof held with such integral diaphragm in direct contact with said flexible diaphragm to provide a reading proportional to the value of said load.

6. The load measuring device of claim 5 wherein said thin reservoir contains a film of hydraulic fluid as thin as about 0.005 inches in depth.

7. The load measuring device of claim 5 including means connected to said transducer to convert said value of said load to weight.

8. The load measuring device of claim 5 wherein said base comprises:
   (i) a base member including a thin central recess therein defining an oil chamber, and a sealed, fixed volume annular shelf therearound;
   (ii) a flexible diaphragm secured to said annular shelf; and
   (iii) a ring, secured to said annular shelf and defining said cylindrical chamber.

9. The load measuring device of claim 8 wherein said thin reservoir contains a film of hydraulic fluid as thin as about 0.005 inches in depth.

10. The load measuring device of claim 8 including means connected to said transducer to convert said value of said load to weight.

11. The load measuring device of claim 5 wherein said base comprises:
    (i) a base member including a deep recess therein surrounded by an annular shelf, thereby defining said cylindrical chamber; and
    (ii) a hollow disc-shaped sac formed of flexible material filled with a load-transmitting material in the form of a non-compressible fluid, disposed at the bottom of said cylindrical chamber, thereby defining in one unitary element said sealed, fixed volume thin reservoir and said flexible diaphragm.

12. The load measuring device of claim 11 wherein said thin reservoir contains a film of hydraulic fluid as thin as about 0.005 inches in depth.

13. The load measuring device of claim 11 including means connected to said transducer to convert said value of said load to weight.

14. A load measuring device operating with a small amount of vertical travel comprising:
    (a) a base including a cylindrical chamber near the bottom thereof;
    (b) a flexible diaphragm disposed in fixed position a small distance from the bottom of said cylindrical chamber to define, therebetween, a thin sealed, fixed volume reservoir for a load-transmitting material in the form of a non-compressible fluid;
    (c) a piston slidable within said cylindrical chamber and resting in face-to-face contact with said flexible diaphragm to apply a load directly to said flexible diaphragm; and
    (d) a transducer including an integral diaphragm at the base thereof held with such integral diaphragm in direct contact with said flexible diaphragm to provide a reading proportional to the value of said load.

15. The load measuring device of claim 14 wherein said thin reservoir contains a film of hydraulic fluid as thin as about 0.005 inches in depth.

16. The load measuring device of claim 14 including means connected to said transducer to convert said value of said load to weight.

17. The load measuring device of claim 14 wherein said piston is provided with a central recess and a concentric aperture and wherein said transducer includes a portion resting in said central recess and an integral diaphragm portion extending through said concentric aperture in direct face-to-face contact with said flexible diaphragm.

18. The load measuring device of claim 17 wherein said thin reservoir contains a film of hydraulic fluid as thin as about 0.005 inches in depth.

19. The load measuring device of claim 17 including means connected to said transducer to convert said value of said load to weight.

20. The load measuring device of claim 17 wherein said transducer includes an upper portion through which said load is transmitted to said flexible diaphragm via said piston.

21. The load measuring device of claim 20 wherein said thin reservoir contains a film of hydraulic fluid as thin as about 0.005 inches in depth.

22. The load measuring device of claim 20 including means connected to said transducer to convert said value of said load to weight.

23. A weigh scale comprising:
  (a) a fixed peripheral frame base structure;
  (b) a central load supporting platform;
  (c) means for interconnecting said platform with said peripheral frame base structure to allow limited vertical motion of the platform, the interconnecting means comprising at least three torque transmitting tubular bars arranged around the perimeter of said load supporting platform, with one portion of each of said torque bars being supported with respect to said fixed peripheral frame base structure, and another portion of each said torque bars being supported with respect to said central load supporting platform; and
  (d) a load measuring device centrally supporting said load supporting platform, said load measuring device comprising a base, a thin sealed, fixed volume reservoir for a load-transmitting material in the form of a non-compressible fluid or a soft rubber forming the lower portion of said base, a flexible diaphragm sealing said thin reservoir and being in direct contact with said load-transmitting material in said reservoir, means for applying a load directly to said flexible diaphragm, and a transducer including an integral diaphragm at the base thereof held with such integral diaphragm in direct contact with said flexible diaphragm to provide a reading proportional to the value of said load, and including means connected to said transducer to convert said value of said load to weight.

24. A weigh scale comprising:
  (a) a fixed peripheral frame base structure;
  (b) a central load supporting platform;
  (c) means for interconnecting said platform with said peripheral frame base structure to allow limited vertical motion of the platform, the interconnecting means comprising at least three torque transmitting tubular bars arranged around the perimeter of said load supporting platform, with one portion of each of said torque bars being supported with respect to said fixed peripheral frame base structure, and another portion of each of said torque bars being supported with respect to said central load supporting platform; and
  (d) a load measuring device centrally supporting said load supporting platform, said load measuring device comprising a base including a cylindrical chamber near the bottom thereof, a flexible diaphragm disposed in fixed position a small distance from the bottom of said cylindrical chamber to define, therebetween, a thin sealed, fixed volume reservoir for a load-transmitting material in the form of a non-compressible fluid or a soft rubber, a piston slidable within said cylindrical chamber and resting in face-to-face contact with said flexible diaphragm to apply a load directly to said flexible diaphragm, and a transducer including an integral diaphragm at the base thereof held with such integral diaphragm in direct contact with said flexible diaphragm to provide a reading proportional to the value of said load and including means connected to said transducer to convert said value of said load to weight.

* * * * *

UNITED STATES PATENT AND TRADEMARK OFFICE
CERTIFICATE OF CORRECTION

PATENT NO. : 4,383,584
DATED : May 17, 1983
INVENTOR(S) : George DYCK

It is certified that error appears in the above-identified patent and that said Letters Patent are hereby corrected as shown below:

In the Heading of the Patent, after the category

"Related U.S. Application Data", insert

--[30] Foreign Application Priority Data

Feb. 15, 1980 [CA] Canada..............345733--.

Signed and Sealed this

Twenty-sixth Day of March 1985

[SEAL]

Attest:

DONALD J. QUIGG

Attesting Officer      Acting Commissioner of Patents and Trademarks